United States Patent [19]

Shu

[11] Patent Number: 5,574,425
[45] Date of Patent: Nov. 12, 1996

[54] ANTI-HIJACKING SAFETY SYSTEM FOR A VEHICLE AND ITS DRIVER

[75] Inventor: Ji W. Shu, Monterey Park, Calif.

[73] Assignee: AAA Plus International, Inc., Monterey Park, Calif.

[21] Appl. No.: 382,981

[22] Filed: Feb. 3, 1995

[51] Int. Cl.$^6$ .................................................. B60R 25/10
[52] U.S. Cl. ........................ 340/426; 180/287; 307/10.2
[58] Field of Search ................................. 340/426, 428; 307/10.2, 10.4, 10.5; 180/287

[56] References Cited

U.S. PATENT DOCUMENTS

| | | | |
|---|---|---|---|
| 4,575,706 | 3/1986 | Heidman, Jr. | 340/426 |
| 5,041,810 | 8/1991 | Gotanda | 340/426 |
| 5,153,558 | 10/1992 | Robinson et al. | 340/426 |
| 5,172,093 | 12/1992 | Nose et al. | 340/426 |
| 5,307,048 | 4/1994 | Sonders | 340/426 |
| 5,319,351 | 6/1994 | Beezley, Jr. | 340/426 |
| 5,357,560 | 10/1994 | Nykerk | 340/426 |
| 5,382,948 | 1/1995 | Richmond | 340/426 |
| 5,394,135 | 2/1995 | Stadler | 340/426 |

FOREIGN PATENT DOCUMENTS 951404  7/1974  Canada ........................ 340/426

*Primary Examiner*—Brent A. Swarthout
*Attorney, Agent, or Firm*—Robert A. Schruhl

[57] ABSTRACT

An anti-hijacking security system for a vehicle that provides the owner with a period of time to reach safety before beginning a series of warning alarms to the unauthorized driver. The alarms escalate from an initial audible warning during which the driver can still disable the security system, to both visual and audible warnings that engine disablement is imminent during which disablement of the security system is no longer possible. The warnings are provided to permit the driver an opportunity to park or pull the vehicle to the roadside for safety of surrounding vehicles and their drivers. Once the initial warning period is ended, the system can only be deactivated by means of an access code entered through a keyboard.

5 Claims, 1 Drawing Sheet

ANTI-HIJACKING SAFETY SYSTEM FOR A VEHICLE AND ITS DRIVER

NOTICE REGARDING COPYRIGHTED MATERIAL

A portion of the disclosure of this patent document contains materials which are subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

This invention relates in general to an anti-hijacking system for use in any kind of automobile, and more particularly to a system for insuring the safety of the vehicle's driver and those individuals proximate a vehicle which is being hi-jacked.

2. Background of the Invention

This anti-hijacking system is specifically designed to counter car hijacking and car theft while emphasizing the safety of the driver of the car and any individuals who may be in the area at the time of the incident.

The system of the present invention allows the victim of a hijacking sufficient time to escape the area before providing the unauthorized driver with notice of the system's activation. Specifically, the system of the present invention allows a victim the opportunity to seek shelter or give the thief the impression of cooperation without undue risk to their own safety which may be compromised by an immediate warning notice given to the thief when he attempts to drive the car away from the spot. Thieves, enraged at the thought that their hijacking attempt is thwarted, have been known to either compel the owner to disable the vehicle's security system or have injured the victim out of spite.

Also, in the system of the present invention, prior to the engine being shut off, multiple warning signals and indicators, both aural and visual are given the unauthorized driver. These signals include sound, voice, interior and exterior blinking lights and are designed not only to warn the unauthorized driver of the imminent engine shutoff, but also to provide him with sufficient time to safely park or pull the vehicle to the side of the road for the safety of any individuals who may be near him at the time of engine shutoff.

OBJECTS AND SUMMARY OF THE INVENTION

Accordingly, it is an object of the present invention to provide a vehicle security system that is designed with the safety of the victim in mind.

It is still another object of the present invention to provide a vehicle security system that is designed to protect both the hijacker and those who may be proximate him when the system disables the vehicle.

General Theory of Operation

Every time the vehicle is started, the system is activated. If the driver shuts off the hidden on-off switch, then the system will be deactivated. However, if a door to the vehicle is opened, then the system will be activated again and become self-locked into its operating cycle as described below. To protect the vehicle's owner, after the car has been started, but the brake has not been applied, the timing circuit of the system will not start counting. This is to take into consideration the possibility that the carjacker does not leave the scene of the incident immediately.

After the carjacker or car thief has started the car, for about 60 to 90 seconds, he/she will not notice anything different about the operation of the vehicle. This time period should be sufficient for the carjacker or thief to drive away from the victim. After that time, there will be a beeping sound inside the car to warn the driver that the security system has been activated. Should the legitimate driver have forgotten to turn off the security system previously, he/she can deactivate the system by using a hidden on-off switch at this time.

If the driver cannot find the hidden on-off switch to deactivate the system after the beeping sound has started, shutting off the engine with the key-lock will not deactivate the system. After a period of time, such as 15 seconds, of beeping sound, the voice warning circuit will be activated. Warning will be given in an appropriate language, such as English, that the vehicle engine will be shut off momentarily and advise that the vehicle should be stopped immediately. At the same time as this verbal warning is being made, the brake lights of the vehicle will start flashing to warn and attract the attention of individuals around the vehicle.

Following another preset period, such as 50 seconds, after the voice warning and flashing brake lights have started, the engine will be disabled and shut off. The horn of the vehicle will at this time start to sound intermittently. The 50 or so seconds were to allow the carjacker adequate time to drive the vehicle to the curb so as to prevent accidents that might be caused by an abrupt engine stall or shutoff. This system can also be adjusted so that 30 or so seconds prior to the engine being disabled, the horn would sound. This provision is made in case the driver could not hear all previous warnings due to excessive noise.

After the engine has been shut off by the system, the vehicle cannot be restarted by the key-lock. The hidden on-off switch also cannot be used to deactivate the system. The horn will sound intermittently for a preset period of time, as for example 5 or so minutes, and then stop. The brake lights at the back will continue flashing to attract attention. To restore the system to normal operation, the legitimate owner will have to use a hidden keypad to enter a predetermined access code.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT

Figure 1:
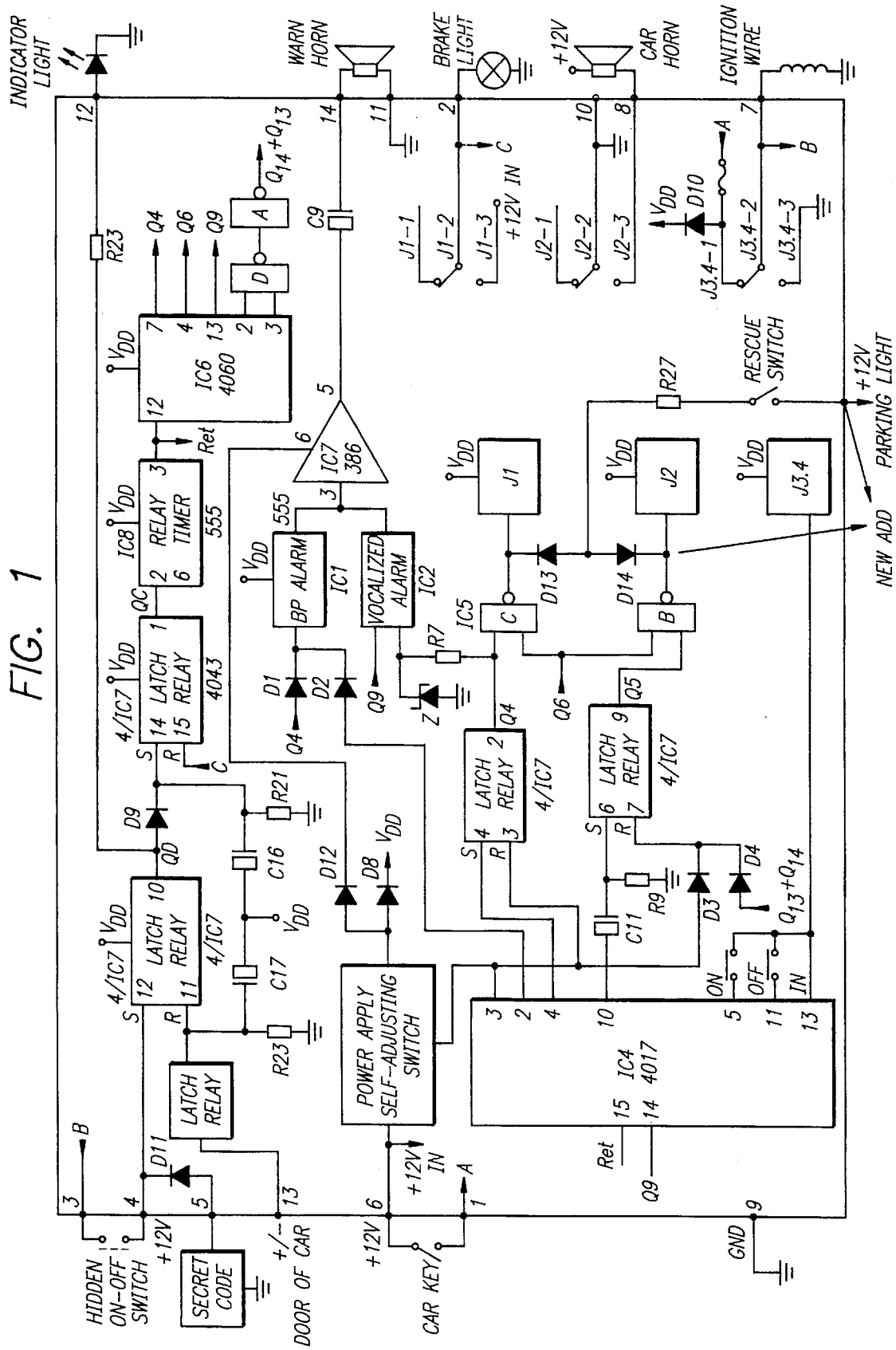
FIG. 1 is a schematic diagram of an alarm system constructed in accordance with the present invention.

First, the operational sequence of a preferred embodiment of the present invention will be described.

When the owner of the vehicle starts the engine, he will need to turn off the hidden on-off switch of the system. This hidden on-off switch is preferably installed at a location in the vehicle according to the desires of the owner that is known only to the owner. When the hidden on-off switch is in the off position, it is preferred that a green indicator light, such as a Light Emitting Diode (LED), be lit to show the driver that the system is in its normal mode.

To provide the owner with additional safety against carjackings, anytime a door of the vehicle is opened, even though the engine has been started and the security system of the present invention has been turned off previously by the owner, the system is activated. This action is automatic and the vehicle owner will not need to turn on the hidden off-on switch for this to happen.

If the vehicle owner forgot to turn off the hidden on-off switch after starting the car, a beeping sound will be emitted for a preset period of time, such as 60 seconds, to remind the vehicle owner to turn off the hidden on-off switch. The vehicle at this time should be running normally.

Should the driver shut off the engine after hearing the beeping sound, the system will still proceed with the alarm sequence. The only way to deactivate the system at this time is to turn off the hidden on-off switch.

If the beeping sound fails to cause the driver to turn off the hidden on-off switch, 15 seconds or so later, a voice warning will be emitted and the braking lights at the back of the vehicle will start flashing. This warning condition is a further protective measure that will persist for about 50 or so seconds. The owner should immediately turn off the hidden on-off switch at this time. A carjacker will most likely stop the vehicle at this point. The flashing brake lights provide a sharp warning to drivers behind the vehicle to use caution.

After the voice warning has been emitted for about 50 seconds, the vehicle engine will be shut off automatically. The horn will now be sounded intermittently and the braking lights will continue to flash. The entire alarm system is now locked in this mode and the vehicle engine cannot be restarted. The horn will stop sounding after 4 to 5 minutes, but the braking lights will continue to flash to attract the attention of the police and other drivers.

To restore the system to its normal operating mode, first the hidden on-off switch must be turned off. Then a predetermined access code must be entered into the system using a hidden keypad to reset the timer and disabling circuitry of the invention. This is the only way that unlocking of the system can be accomplished.

Generally, a preferred embodiment of the present invention is embodied in an automatically activated anti-hijacking vehicular alarm system which includes a sensor latch circuitry for providing an output signal in response to detection of either an attempt to start the vehicle engine or the opening of a vehicle door.

Brake activation detection circuitry provides an output signal in response to detection of the activation of the brake system of the vehicle.

A manually actuated switch and a key for selectively operating the switch is used for generating a first reset signal to reset the sensor latch circuitry means and a timer circuit.

The timer circuit has a sequential series of at least a first, second, third and fourth timer cycles. The timer circuit is responsive to the sensor latch circuit output signal and to the brake activation detection circuit output signal, for starting the sequential series of timer cycles whenever both output signals are received by the timer circuit, wherein when each of the timer cycles begins, the timer circuit outputs a first, second, third and fourth trigger signal respectively. The timer circuit is further responsive to the first reset signal to reset the timer circuit if the first reset signal is detected during the first timer cycle.

An audible oscillator circuit is responsive to the first timing cycle trigger signal from the timer circuit for providing a driver of the vehicle with a first audible warning of the activation of the timer circuit.

A speech generation circuit is responsive to the second timing cycle trigger signal from the timer circuit and provides a driver of the vehicle with second audible warning of the activation of said timer means vocalized in a known language.

A visual warning circuit is responsive to the second timing cycle trigger signal from the timer circuit and includes a circuit adapted for flashing a brake light of the vehicle for providing a driver of the vehicle with a first visual warning of the activation of the timer circuit.

A vehicle engine disabling circuit is responsive to the third timing cycle trigger signal from the timer circuit for disabling the engine of the vehicle.

An audible warning circuit is further responsive to the third timing cycle trigger signal from the timer circuit and includes a circuit adapted to sound a horn of the vehicle for providing a driver of the vehicle with third audible warning of the activation of the timer means. The horn sounding circuit further has a timer circuit for intermittently sounding the horn for only a preset period of time.

A second manually actuated reset signal generating circuit generates a second reset signal to reset the sensor latch and timer circuits during the second, third and fourth timer cycles of the timer circuit.

The second manually actuated reset signal generating curcuit preferably includes a memory device for storing an authorized reset code signal. The preferred memory device is preferably non-volatile, such as an EEPROM circuit, even after removal of the alarm system from an electrical power source of the vehicle, by being connected to a battery back-up circuit.

A code entry device, such as a keypad, generates a user selected code signal that is used as an input signal to a comparison circuit operatively connected to both the memory device and the code entry device for comparing the user selected code signal with the authorized reset code signal stored in the memory device. The comparison circuit generates the second reset signal to reset the sensor latch and timer circuits during the second, third and fourth timer cycles of the timer circuit whenever a match is found.

Finally, it is preferred in an alternate embodiment of the present invention to include a time delay circuit operatively connected to the comparison circuitry for introducing a waiting period when the user selected code signal does not match with the authorized reset code signal stored in the memory device. The comparison circuit is held inoperative to generate the second reset signal to reset the sensor latch and timer circuitry during the second, third and fourth timer cycles of the timer circuit until the waiting period has expired.

A preferred method embodying the above circuits of the present invention is now described with reference to FIG. 1 which illustrates a preferred circuit in schematic form embodying the present invention.

IC1 is preferably a "555 IC Timer", and along with R1, R2, R3, R4, C1, C2, C3, D1 and D2 collectively forms the alarm oscillation circuitry to provide the beeping sound. Pin 4 of IC4, through D2, controls the oscillation of IC1. Pin 7 of IC6, through D1, controls the on/off frequency of the beeping sound. The alarm signal on Pin 3 of IC1, through the voltage divider R1 and R2, is coupled by C1 onto power amplifier IC3. The purpose of the voltage divider R1 and R2, is to bring the signal amplitude close to that generated by IC2 (the voice circuit). R4 and R5 determine the oscillation frequency of IC1. If the resistive value of R4 is high, the frequency is low. Similarly, if the resistive value of R4 is low, then the frequency is high.

IC2 is the signal source for the voice generating circuitry. IC2 (the voice circuit), R5, R6, R7, C4, C5, C6 and Zener diode Z, collectively form the voice warning circuit of the invention. Pin 2 of IC7 controls the working electrical current of the voice chip. Zener diode Z (3.9 V) regulates the voice chip's necessary working voltage. Voice signal present at pin 4 of IC2 is coupled by C4 onto the input end of the power amplifier.

IC3 is the signal amplifier for the beeping and voice sounds produced by the system. IC3 (386), R8, C7, C9, C10, C21, W1 and D12, form the power amplifier circuit. It amplifies the beeping and voice signals. Using C9, these signals are coupled onto the speaker (S.P.). W1 adjusts the volume of the sound.

IC4 is the multiple trigger sequence controller circuit. IC4 (4017) controls the operation sequence. It sequentially enables the beeping, voice, braking lights, horning and engine disabling. Also, it automatically protects the power supply to the system while the alarm is activated.

IC5 is the NAND gate control circuit. IC5 (4011) has A to D four NAND gates. A, D and D14 control the R terminal of the B R/S latch. When both pins 2 and 3 of IC6 are in the "1" state, NAND gate A pin 3 will output a "1" to the R terminal, making the B latch output a "0" state. When the NAND gate B is closed, NAND gate C and R10, T1, J1 and D5 control the braking lights. When NAND gate C pin 8 is in the "0" state, pin 10 is in a "1" state, T1 stops conducting and J1 stops working. When pin 8 is in the "1" state, NAND gate is open. Now whether T1 is conducting or not is controlled by pin 9. The operating frequency of J1 is decided by the pulse frequency of pin 9. Similarly, NAND gate B, R11, T2, D6 and J2 control the sounding of the vehicle's horn.

IC6 is the signal source of the base clock signal for all control circuits. It also controls the pulse signals needed by IC4 (the 4017 chip), and the time intervals between the beeping sound, voice sound, blinking brake lights and horn sounding sequence. IC6 (4043), R14, R15 and C14 form the oscillation frequency division counter. Pin 13 supplies the clock signal to IC4. Pin 7 supplies the on/off frequency of the beeping sound to IC1. Pin 4 supplies the brake lights blinking and horn on/off frequency. Pins 2 and 3 together provide the reset pulse to the R terminal of RS latch B.

IC7 is an integrated circuit chip having four RS latches A, B, C and D. Latch A controls the brake lights blinking interval and the starting of the voice circuit. Latch B controls the starting and stopping of the vehicle horn and the intermittent sounding of the horn. Latch C controls the time delayed starting and stopping of IC8. Latch D controls the vehicle door switch, hidden on-off switch, code entry switch and braking switch.

IC7 (4043) has four RS latches, designated A, B, C and D. S is an input terminal that sets the latch to a "1" state. R is the input terminal that resets the latch to a "0" state. A positive going pulse at the S terminal will cause the latch to output a "1" state. The output will be a "0" state if the same thing happens to the R input. If both R and S inputs are a "1" state, output Q is a "1" state. If both R and S inputs are a "0" state, output Q remains unchanged. Latch B, R11, T2, J2 and D6 control the vehicle horn. Latch C, R17, R21, C16 and T4 control the time delay circuit. Latch D, R22, R23, R24, R25, C17, C18, C19, C20 and D9 form the circuit that controls the S terminal of the C latch. This circuit also turns on the green Light Emitting Diode (LED) to indicate that the system is inactive.

IC8 controls the 60 second delay alarm switch.

IC8, preferably a "555 timer", R16, W2, C12 and C13 form the time delay circuit. W2 is used to adjust the delay time from 30 to 90 seconds. When T4 is conducting, pin 3 of IC8 outputs a "1" state, resetting pin 6 of IC4. When T4 stops conducting, after 30 to 90 seconds, pin 3 will output a "0" state. IC6 will then start oscillating.

T5, T6, R18, R19 and R20 form the power supply self-sustaining electronic switch. After the sequence proceeds for 60 seconds, the self-sustaining electronic switch starts to operate.

T7, T8, R23, R22, R24, C17, C18 and C19 form the positive/negative single line trigger circuit. This circuit will be compatible with different car manufacturer's interior lights operating voltages. (The interior light is turned on when a car door is open.)

Keypad (K.P.) deactivates the alarm system.

In an alternate embodiment of the present invention, the circuitry for generating a second reset signal to reset the sensor latch circuit and timer circuit during the second, third and fourth timer cycles of the timer circuit includes a memory or storage circuit for storing an authorized reset code signal used in conjunction with a code entry device, such as the keypad, for generating a user selected code signal.

A comparison circuit is operatively connected to the memory and the code entry circuitry for comparing the user selected code signal with the authorized reset code signal stored in the memory circuit and for generating a second reset signal to reset the sensor latch circuit and timer during the second, third and fourth timer cycles of the timer whenever a match is found.

The embodiment also includes keeping the memory circuit for storing an authorized reset code signal non-volatile for storing the authorized reset code signal even after removal of the alarm system from an electrical power source of the vehicle, by being connected to a battery back-up circuit. The memory circuit may accomplish this by being an EEPROM circuit.

Finally, such alternate embodiment may further include having a time delay circuit for introducing a waiting period when the user selected code signal does not match with the authorized reset code signal stored in the memory means. The comparison circuit is preferably held inoperative to generate the second reset signal to reset the said sensor latch circuit and timer during the second, third and fourth timer cycles of the timer until the waiting period has expired.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. An automatically activated anti-hijacking vehicular alarm system comprising:

sensor latch means for providing an output signal in response to detection of either an attempt to start the vehicle engine or the opening of a vehicle door;

brake activation detection means for providing an output signal in response to detection of the activation of the brake system of the vehicle;

first manually actuated switch means and a key for selectively operating said switch for generating a first reset signal to reset said sensor latch means and a timer means;

timer means having a sequential series of at least a first, second, third and fourth timer cycles, said timer means being responsive to said sensor latch means output signal and to said brake activation detection means output signal, for starting said sequential series of timer cycles whenever both output signals are received by said timer means, wherein when each of said timer cycles begins, said timer means outputs a first, second, third and fourth trigger signal respectively, said timer means further responsive to said first reset signal to reset said timer means if said first reset signal is detected during said first timer cycle;

audible oscillator circuit means responsive to said first timing cycle trigger signal from said timer means for providing a driver of the vehicle with first audible warning of the activation of the timer means;

speech generation circuit means responsive to said second timing cycle trigger signal from said timer means for providing a driver of the vehicle with second audible warning vocalized in a known language of the activation of said timer means;

visual warning means responsive to said second timing cycle trigger signal from said timer means including a circuit adapted for flashing a brake light of the vehicle for providing a driver of the vehicle with a first visual warning of the activation of the timer means;

vehicle engine disabling means responsive to said third timing cycle trigger signal from said timer means for disabling the engine of the vehicle;

audible warning means responsive to said third timing cycle trigger signal from said timer means including a circuit adapted to sound a horn of the vehicle for providing a driver of the vehicle with third audible warning of the activation of the timer means, said horn sounding circuit further having means for intermittently sounding said horn for only a preset period of time; and, second manually actuated reset signal generating means for generating a second reset signal to reset said sensor latch means and a timer means during said second, third and fourth timer cycles of said timer means, said second manually actuated reset signal generating means comprising:

memory means for storing an authorized reset code signal;

code entry means for generating a user selected code signal; and, comparison means operatively connected to said memory means and to said code entry means for comparing said user selected code signal with said authorized reset code signal stored in said memory means and for generating said second reset signal to reset said sensor latch means and a timer means during said second, third and fourth timer cycles of said timer means whenever a match is found.

2. An alarm system as in claim 1 wherein said code entry means for generating a user selected code signal comprises a keypad.

3. An alarm system as in claim 1 wherein said memory means for storing an authorized reset code signal is maintained in a non-volatile state, even after removal of the alarm system from an electrical power source of the vehicle, by being connected to a battery back-up circuit.

4. An alarm system as in claim 1 wherein said memory means for storing an authorized reset code signal is maintained in a non-volatile state, even after removal of the alarm system from an electrical power source of the vehicle, by constituting said memory means as an EEPROM circuit.

5. An alarm system as in claim 1 wherein said comparison means includes a time delay means for introducing a waiting period when said user selected code signal does not match with said authorized reset code signal stored in said memory means, said comparison means being inoperative to generate said second reset signal to reset said sensor latch means and a timer means during said second, third and fourth timer cycles of said timer means until the waiting period has expired.

* * * * *